US008881369B2

(12) United States Patent
Kirby et al.

(10) Patent No.: US 8,881,369 B2
(45) Date of Patent: Nov. 11, 2014

(54) METHODS FOR USING A REUSABLE QUICK RELEASE FASTENER SYSTEM

(76) Inventors: Brandon Charles Kirby, LaVale, MD (US); Kristin Marie Cable, Monroe, OH (US); Teresa Ellen Havens, Bellbrook, OH (US); Jason Michael Hermiller, Liberty Township, OH (US)

( * ) Notice: Subject to any disclaimer, the term of this patent is extended or adjusted under 35 U.S.C. 154(b) by 547 days.

(21) Appl. No.: 13/002,466

(22) PCT Filed: Apr. 28, 2009

(86) PCT No.: PCT/US2009/041876
§ 371 (c)(1),
(2), (4) Date: Mar. 15, 2011

(87) PCT Pub. No.: WO2010/030412
PCT Pub. Date: Mar. 18, 2010

(65) Prior Publication Data
US 2011/0265292 A1    Nov. 3, 2011

Related U.S. Application Data

(60) Provisional application No. 61/077,674, filed on Jul. 2, 2008.

(51) Int. Cl.
*H01S 4/00*   (2006.01)
*A44B 18/00*   (2006.01)

(52) U.S. Cl.
CPC ......... *A44B 18/0053* (2013.01); *C08L 2201/12* (2013.01); *A44B 18/0096* (2013.01)
USPC ............ 29/592.1; 29/729; 606/108; 606/195; 428/292.1; 428/295.1; 428/297.4; 428/299.1; 156/307.1; 156/307.3; 156/307.4

(58) Field of Classification Search
USPC ......... 29/603.03, 729, 737, 739; 24/451, 442, 24/445, 446; 702/108; 606/108.109; 428/292.1, 295.1, 297.4, 299.1
See application file for complete search history.

(56) References Cited

U.S. PATENT DOCUMENTS

| 2,717,437 | A |   | 9/1955 | DeMestral |
|---|---|---|---|---|
| 5,203,053 | A | * | 4/1993 | Rudd ............................. 24/306 |
| 5,983,467 | A | * | 11/1999 | Duffy ............................. 24/442 |
| 6,086,599 | A | * | 7/2000 | Lee et al. ...................... 606/108 |
| 6,759,481 | B2 |   | 7/2004 | Tong |
| 6,920,675 | B2 |   | 7/2005 | Browne |
| 6,973,701 | B2 | * | 12/2005 | Momoda et al. ................ 24/442 |
| 7,013,536 | B2 |   | 3/2006 | Golden |
| 7,013,538 | B2 | * | 3/2006 | Browne et al. .................. 24/603 |
| 7,308,738 | B2 | * | 12/2007 | Barvosa-Carter et al. ...... 24/442 |
| 8,163,376 | B2 | * | 4/2012 | Hayashi et al. ............ 428/292.1 |

* cited by examiner

*Primary Examiner* — Paul D Kim
(74) *Attorney, Agent, or Firm* — Dinsmore & Shohl LLP

(57) ABSTRACT

Methods for using a reusable quick release fastener system include engaging and disengaging fastening devices composed of elastomers or shape memory polymers and their composites wherein the fastening devices may be of any number of geometrical shapes such that the mating geometries of each device are compatible with one another. The fastening devices provide an easy and near silent closure mechanism for a container, for example. Thus, the methods for using reusable quick release fastener systems including the fastening devices made of elastomers or shape memory polymers can be used to attach one part to another or to quietly close a pocket, box, or other container, for example.

20 Claims, 13 Drawing Sheets

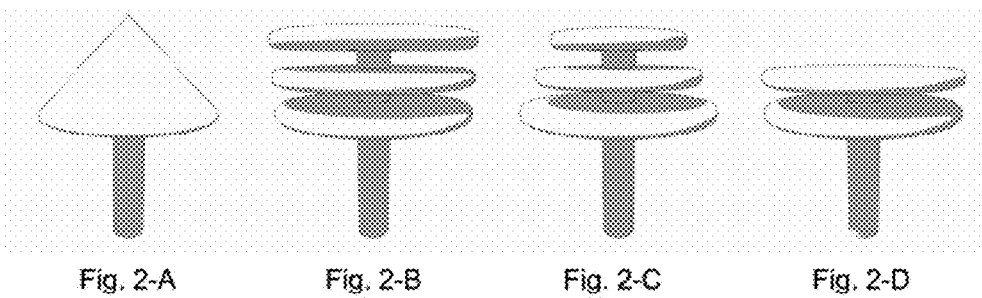
Fig. 2-A   Fig. 2-B   Fig. 2-C   Fig. 2-D
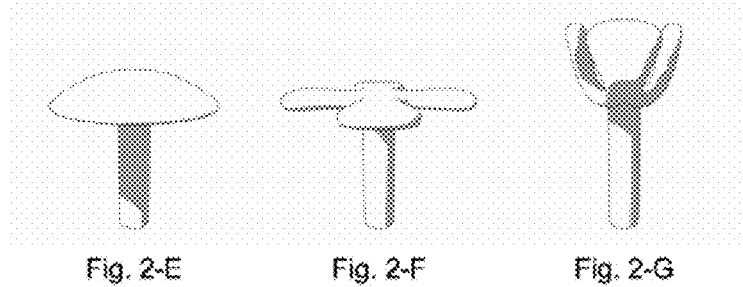
Fig. 2-E   Fig. 2-F   Fig. 2-G

METHODS FOR USING A REUSABLE QUICK RELEASE FASTENER SYSTEM

CROSS-REFERENCE TO RELATED APPLICATIONS

This application is a national stage entry of PCT/US2009/041876 filed on Apr. 28, 2009, which claims priority to U.S. Provisional Application No. 61/077,674 filed on Jul. 2, 2008. This application is also related to U.S. patent application Ser. No. 11/611,358 filed Dec. 15, 2006, which claims priority to U.S. Provisional Application No. 60/750,500 filed Dec. 15, 2005.

STATEMENT REGARDING FEDERALLY SPONSORED RESEARCH OR DEVELOPMENT

This invention was made with U.S. Government support under Contract No. W56HZV-06-C-0594 awarded by U.S. Army Tank-Automotive and Armaments Command to Cornerstone Research Group, Inc. The U.S. Government has certain rights in the invention.

BACKGROUND OF THE INVENTION

1. Field of the Invention

This disclosure relates to an apparatus and process for on-demand attachment or disengagement of components for use as a means in an easy and quiet or nearly silent container closure mechanism or fastener system. As used in this specification quiet and nearly silent can be used interchangeable and mean a sound that is typically less than 60 decibels. Specifically this application deals with the use of elastomers, shape memory polymers, shape memory polymer composites, or elastomeric composites as the connection devices in a fastener system. More specifically this application deals with the use of elastomers, shape memory polymers, shape memory polymer composites, or elastomeric composites as the connection portions in a fastener system which can be used to attach a first part to a second part or act as the closure mechanism for a pocket, box, or other container.

2. Description of Related Art

Shape memory polymers (SMPs) and shape memory alloys (SMAs) were first developed about twenty years ago and have been the subject of commercial development in the last ten years. SMPs are polymers that derive their name from their inherent ability to return to their original "memorized" shape after undergoing a shape deformation. All SMPs have at least one transition temperature (hereinafter "$T_g$") at which point the SMP transitions between a hard rigid plastic to a soft, pliable, elastomeric polymer. When the SMP is above its $T_g$ it is soft and elastic, when below its $T_g$ it is rigid. Once the temperature of the SMP is above its $T_g$ the SMP can generally be deformed into the desired shape. The SMP must then be cooled below its $T_g$ while maintaining the desired deformed shape to "lock" in the deformation. Once the deformation is locked in, the polymer network cannot return to its "memorized," or original shape due to thermal barriers. The SMP will hold its deformed shape indefinitely until it is again heated above its $T_g$, when the SMP stored mechanical strain is released and the SMP returns to its "memorized" shape. It is important to note that the $T_g$ represents the average temperature at which a material transitions from a rigid polymer to an elastomeric polymer. Because it is an average temperature the polymer can sometimes exhibit limited shape memory recovery below the $T_g$. Typically this limited recovery is small enough and occurs close enough to the $T_g$ that it does not affect the function for which the SMP is designed.

Shape memory materials derive their name from their inherent ability to return to their original "memorized" shape after undergoing a shape deformation. There are three types of SMPs: (1) partially cured polymers, (2) thermoplastic polymers; and (3) fully cured thermoset polymers. There are limitations and drawbacks to the first two types of SMPs.

Partially cured polymers continue to cure during operation and change properties with every cycle. Thermoplastic polymers "creep," which mean they gradually "forget" their memory shape over time because they are liquids that become solid upon curing. But unlike thermoset resins, thermoplastic polymers can be softened by application of heat or other stimuli and they can be heated and reshaped repeatedly. Additionally, conventional thermoset resins (those that are not SMP) are liquids that react with a catalyst to form a solid, but they cannot be returned to their liquid state and, therefore, cannot be reshaped without destroying the polymer networks.

The current application uses shape memory polymers which are a set of unique polymers that can be reshaped and formed to a great extent because of their shape memory nature but will not return to a liquid upon application of heat. SMPs utilize the beneficial properties of both thermoset and thermoplastic resins while eliminating or reducing the unwanted properties.

When heated above the transition temperature, the links between the SMP molecular connections are easily contorted, stretched, or reoriented due to their elastic nature. When cooled below the transition temperature, these SMP connections retain their new reoriented shape. In the cooled state SMP behaves as a conventional rigid polymer that was manufactured in that reoriented shape. When heated again, the SMP returns to the elastic state and can be reformed to another reoriented shape, or, if no constraint or outside force is exerted on the SMP, it will return to its original memory shape.

SMPs used in the presently disclosed device are unique thermoset polymers, which, unlike conventional thermoset polymers, can be reshaped and reformed repeatedly because of their dynamic modulus. These polymers combine the most useful properties of thermoplastic polymers with those of a thermoset polymer enabling designers to utilize the beneficial properties of both thermoset and thermoplastic resins while eliminating or reducing the unwanted properties. Such polymers are described in U.S. Pat. No. 6,759,481 issued to Tong, on Jul. 6, 2004 with other thermoset resins seen in PCT Application No. PCT/US2006/062179, filed by Tong, et al on Dec. 15, 2006; and PCT Application No. PCT/US2005/015685 filed by Tong et al, on May 5, 2005 all of which are hereby incorporated by reference.

The term "composite" is commonly used in industry to identify components produced by impregnating a fibrous material with a thermoplastic or thermosetting resin. Generally, polymers and polymer composites have the advantages of weight saving, high specific mechanical properties, and good corrosion resistance which make them indispensable materials in all areas of manufacturing. The use of other fabrics or reinforcements such as carbon nano-fibers, high strain fabrics (meaning a fabric that can be stretched in at least one direction and will return to its original shape), chopped fiber, random fiber mat, fabric of any material, continuous fiber, fiberglass, filamentous material (meaning a material made of filaments) or other type of textile fabric can be used to replace carbon fiber in the above examples. Common structural fastening technologies include mechanical fastening, e.g., bolts, latches, clasps, and adhesives. These approaches are widely-used and provide adequate fastening capability for many long-term applications.

Hook and loop type separable fasteners are well known and are used to join two members detachably to each other. Hook and loop fasteners provide rapid-release, but require a higher force to release per area of material than other fastener systems. This development is more commonly referred to as VELCRO®. Used in nature for thousands of years, the system was discovered in 1951 and was issued as a U.S. Patent in 1955, U.S. Pat. No. 2,717,437, to G. DeMestral. The essential technology behind quick release fasteners has not changed much since the discovery of VELCRO®. While there have been some developments to make a better releasing systems such as use of less force per area of material or using standard latches that are computer controlled, other developments have been limited to using explosives to quickly release dangerous cargoes and unwanted parts, i.e. explosive bolts, etc. Unfortunately, a means for cheap, repeatable attachment and release of large-area flat panels with a nearly silent release has eluded researchers.

These types of fasteners generally have two components disposed on opposing member surfaces. One component typically includes a plurality of resilient hooks while the other component typically includes a plurality of loops. When the two components are pressed together they interlock to form a releasable engagement. The resulting joint created by the engagement is relatively resistant to shear and pull forces and weak in peel strength forces. As such, peeling one component from the other component can be used to separate the components with a relatively small applied force. As used herein, the term "shear" refers to an action or stress resulting from applied forces that causes or tends to cause two contiguous parts of a body to slide relative to each other in a direction parallel to their plane of contact. The term "pull force" refers to an action or stress resulting from applied forces that causes or tends to cause two contiguous parts of a body to move relative to each other in the direction perpendicular to their plane of contact. Hook and loop type separable fasteners can require different release times to maximize effectiveness for different applications. In some applications, release times are not critical whereas in other applications release times are critical and may be on the order of a few milliseconds.

Examples of hook and loop fastener systems using a type of shape memory material are exemplified by U.S. Pat. No. 7,013,536 issued to Golden et al on Mar. 21, 2006 and U.S. Pat. No. 6,920,675 issued to Browne et al on Jul. 26, 2005. An additional fastener system for use in medical devices is described in U.S. Pat. No. 6,086,599 issued to Lee and Fitch on Jul. 11, 2000. Fitch describes a fastener system for use in implanting medical devices in the human body principally. The fastener system described by Fitch, however, is not useful for a system beyond the micro scale described in the patent. The mating geometries described in Fitch and the tool necessary to move the device around in the body would be impractical on a larger scale.

The system described in Golden relies principally on the ability of the hook and loop material to melt, flow and soften upon heating, thus disengaging the fastener system. The system described by Golden, however, cannot be reused without substantial time and effort or a complete replacement of the hook portions.

Browne describes a similar system to that of Golden however. The system described by Browne, as well as Golden, focuses on the disengagement of the fastener system and not on a method to engage the fastener system. Additionally both Browne and Golden limit the scope of the system described to a hook and loop system.

However, there is a need for a high strength, reusable, quick-release fastener system that has not yet been met. These next-generation fastening systems require equal structural integrity and fastening capability, but additionally require the system to be able to exhibit a removal and replacement capability that does not damage the substrate material. Additionally, these next-generation fastening systems require a low force to remove and replace, a rapid release/replacement cycle time, and they must be able to attach to any material, including metals, polymers and composites.

Therefore there is a need in the art for a quick release fastener system that can use different mating geometries with high strength other than a hook and loop. Additionally there is a need for a fastener system that can be reused and easily engaged or disengaged at desired times and with little difficulty and with little or no noise.

BRIEF SUMMARY OF THE INVENTION

Disclosed herein is a process for engaging and disengaging a releasable fastener system, comprising fastening devices composed of shape memory polymer or shape memory polymer composites wherein the fastening devices may be of any number of geometrical shapes limited only by the fact that each pair of fastening devices are designed such that the mating geometries of each device are compatible with the other and the engagement and disengagement of the fasteners results in little to no noise.

When the rapid release system is activated using an integrated heating system, the fasteners become flexible, allowing simple, snap-on attachment. Once fastened, the system returns to a rigid state, locking the fasteners in place. To detach the fasteners again, a user simply activates the system, transitioning the material back to an elastic state and allowing easy removal. This process can be repeated.

Traditional fastening systems have a "male" and "female" portion. In the hook and loop system described above the male portion is the hook and the female portion is the loop. These traditional systems are limited to parts which contain the male and female portions. Thus, in these systems two female portions or two male portions cannot typically be used to connect two parts together. The device disclosed herein does not utilize the traditional system as each fastening device can be designed to mate and lock with any other similarly designed device. This allows for mass production of the devices as there is no need to retool a factory to produce the male part and then the female part.

To engage the fastener systems, at least two devices with identical or similar mating geometries are connected to the two parts to be joined together. The devices can be made of shape memory polymer or composites. The shape memory polymer is then activated by any number of various mechanisms which will depend on the type of shape memory polymer used. Shape memory polymers may be activated by any number of methods, including, but not limited to, heat, exposure to electromagnetic radiation, water, and other similar means. Once activated, the shape memory polymer or composite becomes soft, flexible and easily manipulated. The two mating geometries are pressed together so as to interlock. The shape memory polymer or composite is then deactivated by any number of various mechanisms, including, but not limited to cooling below $T_g$ exposure to electromagnetic radiation, water, and other similar means. Once the shape memory polymer is deactivated with the devices interlocked by the mating geometries the parts that have been joined are resistant to pull and shear forces. Additionally, because the shape memory polymer is now rigid, the parts are additionally resistant to peel strength forces.

In order to disengage the parts, the process is simply reversed. The shape memory polymer or composite is activated by similar means as described above. Once activated, the SMP or composite is soft, flexible and easily manipulated. The fastening devices are now easily separated with a minimal applied pull, shear or peel forces.

Thus, it is one embodiment of the present invention to provide a quick engagement and disengagement fastening system to allow the joining and removal of two different surfaces together.

The second embodiment of the present invention is to provide an engagement and disengagement system that requires little force to engage or disengage and while engaged to be highly resistant to pull, shear, and peel forces to prevent the joined parts or surfaces from becoming prematurely disengaged from one another. While activated the system will require little force to engage or disengage, however while deactivated, the system will essentially be unable to be engaged or disengaged without damaging the system.

The third embodiment of the present invention is to provide a system wherein the shape memory polymer can be activated or deactivated with a remote signal that activates the energy source which causes the activation or deactivation of the SMP or composite.

The fourth embodiment of the present invention is to provide a system of attaching or detaching parts from automobiles, military vehicles, aircraft, buildings, walls, signs, floors, ceilings, and other surfaces as may be desired.

This disclosure relates to an apparatus and process for on-demand attachment and/or disengagement of components or for use as a means for an easy and near silent closure mechanism for a container. Specifically this application deals with the use of elastomers, shape memory polymers, shape memory polymer composites, or elastomeric composites as the connection devices in a fastener system. More specifically this application deals with the use of elastomers, shape memory polymers, shape memory polymer composites, or elastomeric composites as the connections in a fastener system which can be used to attach one part to another or act as the closure mechanism for a pocket, box, or other container.

The above described and other features are exemplified by the following figures and detailed description.

BRIEF DESCRIPTION OF THE SEVERAL VIEWS OF THE DRAWINGS

FIGS. 2-A though 2-G show several different embodiments of the fastener design which can form interlocking networks.

DETAILED DESCRIPTION OF THE INVENTION

The present discovery is a fastening technology that exploits the unique properties of shape memory polymers. First introduced in the United States in 1984, Shape Memory Polymers ("SMPs") are polymers whose qualities have been altered to give them dynamic shape "memory" properties. Under thermal, electric, light, electromagnetic radiation, water, and other stimuli depending on the type of SMP desired for a particular use. SMP can exhibit a radical change from a rigid thermoplastic to a highly flexible, elastic state, then return to a rigid state again. In its elastic state, SMP will recover its "memory" shape if left unrestrained. The "memory," or recovery, quality comes from the stored mechanical energy attained during the reconfiguration of the material. SMP's ability to change modulus and shape configuration at will makes SMP ideal for applications requiring lightweight, dynamic, and adaptable materials.

Unlike a shape memory alloy (SMA), SMPs exhibit a radical change from a normal rigid polymer to a flexible elastic and back on command, this process can be repeated multiple times with each trial imparting minimal degradation of the material. The SMP transition process is a molecular relaxation, rather than the induced crystalline phase transformation in SMA. In addition, SMPs demonstrate much broader range and versatility than SMA in shape configuration and manipulation with SMPs being able to recover from strains of 400-600% or more and having a wide range of activation methods including heat, light, and water.

A fully cured SMP is a rigid plastic and dramatically softens into an elastic state when the shape memory effect is activated. This activation is typically accomplished by heating the SMP above its glass transition temperature ("$T_g$"). As used throughout this application to activate or activation of an SMP means to make it soft and pliable and as used throughout this application to deactivate or deactivation of an SMP means to make it hard and rigid.

Figure 1:
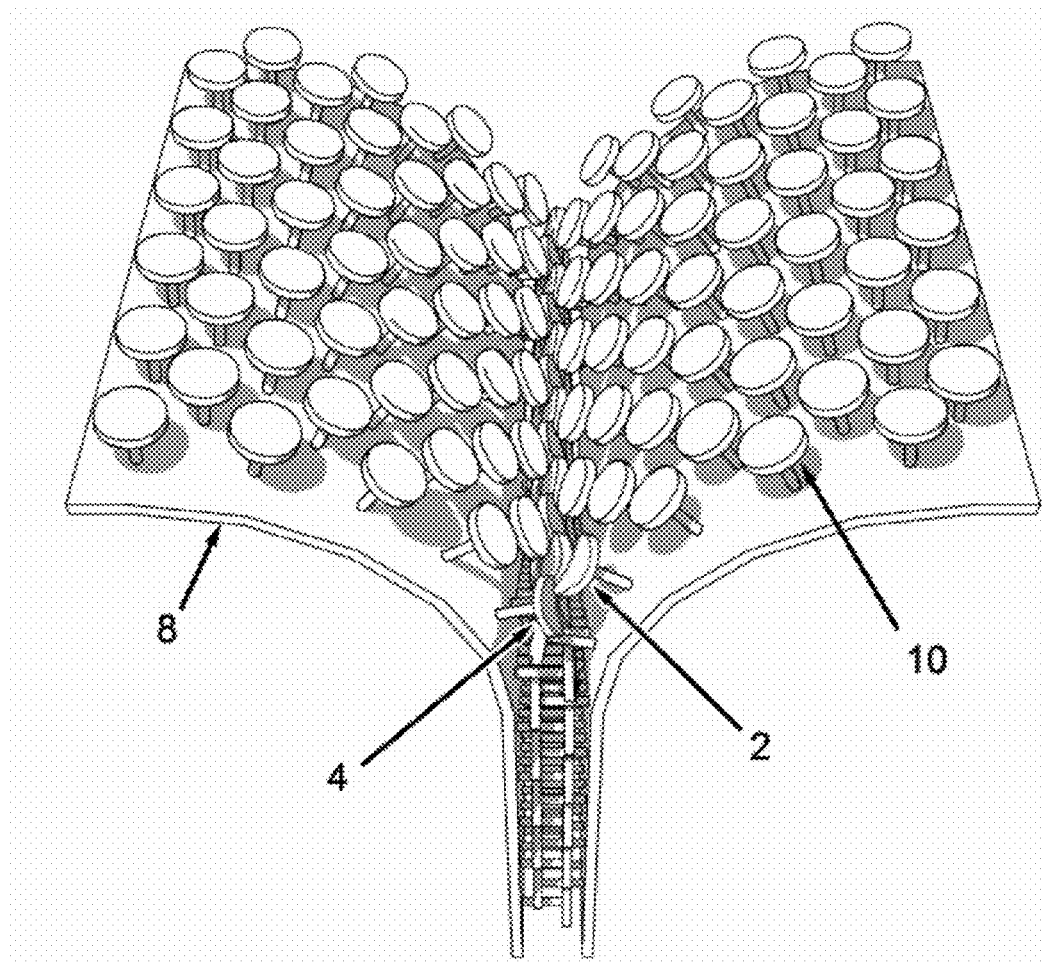
FIG. 1 shows one embodiment of two surfaces being joined together.

Previous SMP fasteners, as described in U.S. patent application Ser. No. 11/611,358 and incorporated herein by reference, show a dramatic materials property change induced from the activation that softens the interlocking geometry of a similar fastener system, which will allow for quick and easy engagement or disengagement of the fasteners, as shown in FIG. 1. In FIG. 1 two sheets, 8 and 10, are joined together by individual fasteners, 2 and 4, whose mating geometries will prevent the sheets, 8 and 10, from involuntarily separating. Throughout this disclosure the phrases "individual fasteners", "fastening devices", "fasteners" are used interchangeably and all mean the connection portions of the system disclosed that form an interlocking network.

The activation mechanism of the prior art, as noted above, is typically heat, but can also be light, water, electromagnetic radiation, and other means which will induce the shape memory effect in the SMP. Activation by heat can be applied through various methods, including embedded nichrome wires, other embedded conductors, placement in conventional ovens, heating blankets, inductive heating, resistive heating, or heat guns. Additionally the present invention can be accomplished by using SMP resin to create a composite material with which to practice the present discovery and whose composite substrate also includes the embedded conductor.

The goal of material selection is to identify the most important material properties for this application, and then select and/or develop a shape memory polymer (SMP) material to satisfy those properties. For the fastening application, the properties below $T_g$ are the most important. Below $T_g$, the material needs to have high toughness, strength, and modulus to be capable of withstanding high loads encountered when fastened and during an impact event. Toughness provides the durability needed in application, while the strength and modulus increases the load the fasteners can hold. The properties above $T_g$, are less stringent, requiring only a low amount of elongation, toughness, and high modulus. The ability for the SMP to return to its original configuration is also necessary so that when the stems or heads deflect during attachment or detachment they return to their upright position to allow proper alignment for the next attachment or detachment cycle.

An epoxy-based SMP was developed with a toughness comparable to that of commercially available toughened epoxies and a $T_g$ of 86° C. Both of these parameters satisfied the need for the fastener system. The high modulus (below $T_e$), 3100 MPa, and the low modulus above $T_g$, 1.4 MPa, are key to the successful performance of the fastening system. The 4.5% elongation to break at room temperature is an indication of the toughness of the material system and is comparable to commercially available epoxy resins.

The goal in designing the fasteners was to create a simple system that could be attached and detached with low force, yet exhibited high strength hold at room temperature. The fabrication of the fasteners was also considered in the design to ensure the fasteners could be manufactured cost effectively. The fasteners were designed to achieve several target properties described below:

Attachment Force/Unit Area: Attachment force is the force required to engage the two sides of the fastener system. The force required to attach the two sides of the fastener must be low in order for this to be a feasible technology, thus one of the goals is to minimize attachment force;

Tensile Strength: The tensile strength of the fasteners is the strength required to detach the fasteners by applying force in an out-of-plane direction. The tensile strength, also comparable to flatwise tension in adhesives, should be maximized;

Shear Strength: Shear strength is the property of the fasteners under loads in-plane and is necessary when used to hold an item in the vertical position. This is similar to a lap shear property in adhesives; and Release Force/Unit Area: The force required to remove the fasteners must be low in order to reduce time and energy of the user.

Figure 13:
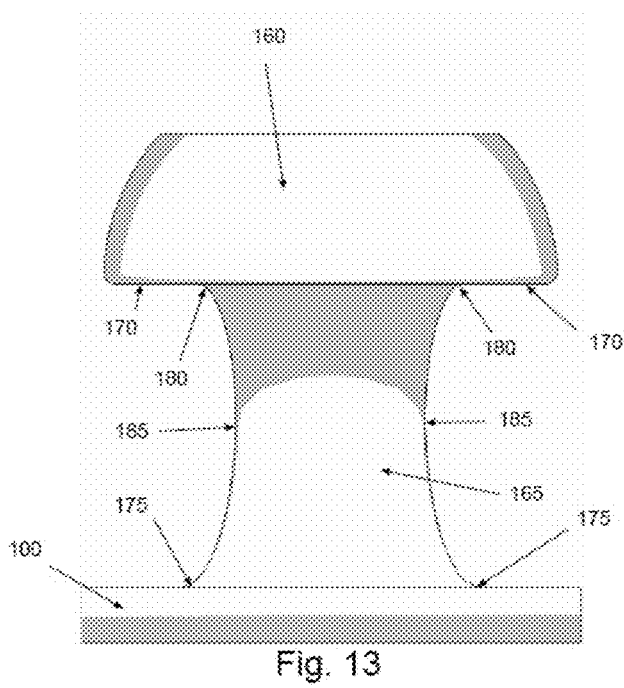
FIG. 13 shows a close-up of the preferred head, 160, and stem, 165, of the interlocking devices.

Building on previous results, a stem and head system was used for simplicity and its symmetry between the two sides. This is advantageous over hook and loop systems because they require a different geometry on each side, which may be overcomplicated and logistically difficult. The stem and head array system could be broken down even further into the geometry of the heads and stems, or the design which facilitates interlocking. Previous designs provided different means to engage with the opposing stem and head system. Fabrication was instrumental in selecting a head-stem geometry for further development. A baseline fastener design consisting of a semicircle head with a straight filleted stem, shown in FIG. 13 was created. The head, 160, is attached to the stem, 165, and has an overlapping edge, 170. The head, 160, is attached to the stem, 165, with a rounded seam, 180. The relatively flat portion, 185, of the stem, 165, provides for a thicker and stronger stem, 165. The rounded edges, 175, at the bottom provide for a strong attachment to a surface. This design is the most preferred as it is the simplest to fabricate and provides adequate surface area to engage and interlock the fastener system. The fasteners are comprised of a fiber-reinforced substrate with neat polymer stems and heads.

Prior designs other than those currently presented could be used to prevent stem failure, thus increasing the strength of the fastener system. This may involve using a set of aluminum or titanium fasteners attached to the metal heads to be attached to each other, with one set of fasteners having longer stems than the others. When an impact occurs the force will be transferred from the attached part, to the base of the SMP fasteners, to the metal heads. The heads of the SMP fasteners will never receive the compression force from impact.

If high structural strength is not required, the apparatus can be made out of a series of head and stem elements that engage to interlock. The material is made out of an elastomeric material to allow the heads and stems to flex and bend, allowing the opposing side to fasten and unfasten.

Figure 11:
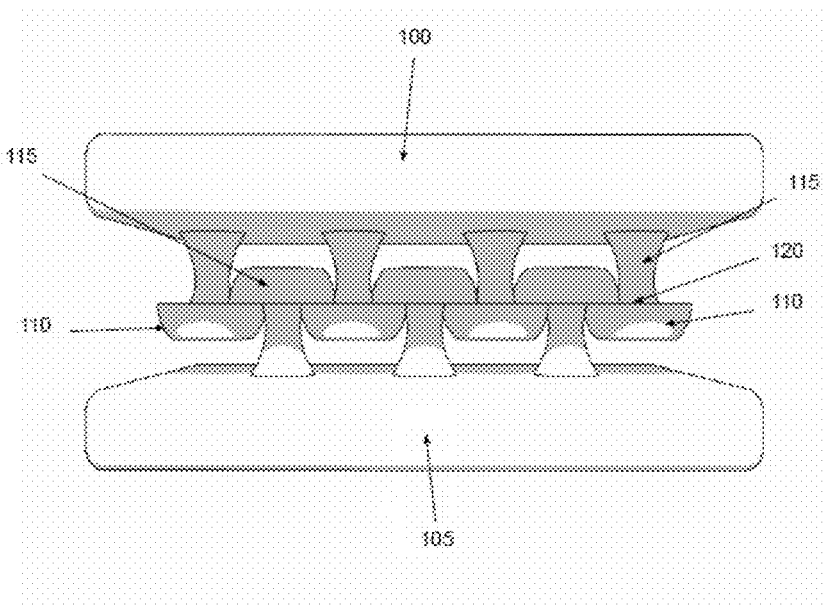
FIG. 11 shows a cross sectional view of a series of interlocking devices, 110 and 115, of the preferred design in a interlocked formation, 120, so as to prevent the two parts, 100 and 105, from separating.
Figure 12:
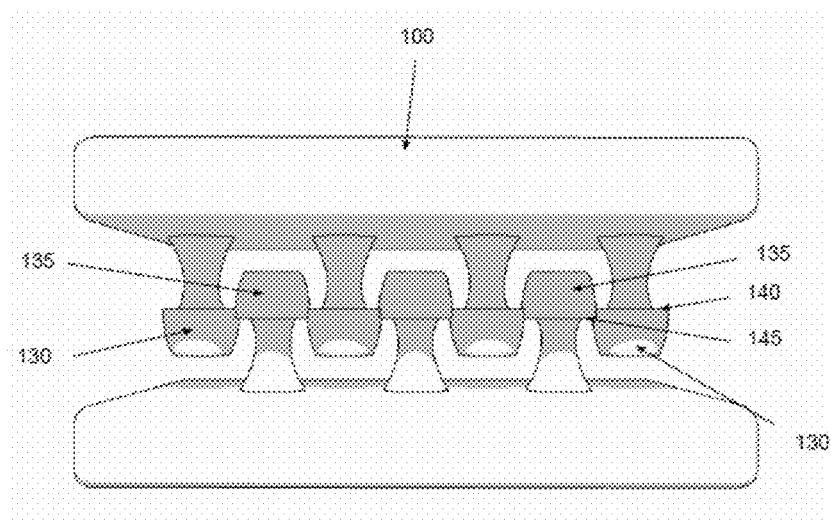
FIG. 12 shows a cross sectional view of a series of interlocking devices, 130 and 135, of the preferred design slipping past each other, 140 and 145, after being deformed and heated to make it easy to separate the two parts, 100 and 105, from each other.

Each set of heads, 115 and 110, consist of a bulk of material that interlocks with the opposing heads to keep the system fastened as shown in FIG. 11. The lips of the heads, 120, overlap with each head, 110 and 115, so as to join the two parts together. As seen in FIG. 12, when fastening the first head, 130, pushes past the opposing heads, 135, causing the stems to flex, and eventually clears, 145, the opposing heads to sit in their fastened state. The bottoms of each head are in contact to keep the system fastened. The heads can be different shapes including hemispheres, spheres, arrow heads, or cones. In addition a barb system can be used to keep the system fastened better.

The stems connect the heads to a base. The base connects all the stems so that multiple stems and heads are not separate. The stem diameter is such that it provides high enough fastening strength but does not cause a force that is too high to disengage the fasteners. The stems must be flexible to allow movement so that the heads can move past each other to unfasten.

Figure 14:
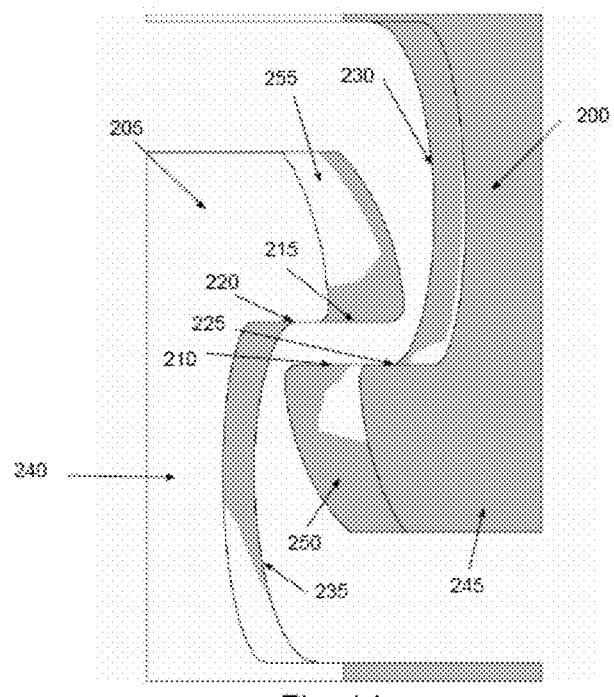
FIG. 14 shows a close up of how a first interlocking devices head, 205, will interlock with a second interlocking devices head, 245.

FIG. 14 shows a close up of how two heads of similar geometry mate. The first head, 205, attached to the first stem, 240, and second head, 245, attached to the second stem, 200, make up the fasteners. The first face, 255, and second face, 250, fit in the cavity caused by the recessed portions of the stems, 230 and 235. The first head, 205, has a face edge, 215, and a back edge, 220, which overlaps the face edge, 210, and back edge, 225, of the second head, 245, to ensure that the fasteners interlock.

The spacing of the heads and stems are also important in the design of the fastening system. Throughout this application, the terms heads and connection portions are used interchangeably and the terms stems and connection supports are used interchangeably. The spacing must be minimized to provide maximum amount of head to head contact. When engaged, the surface area of the head on the opposing head is directly related to the hold strength. The spacing also has to do with the amount of "play" present in the system. "Play" is the term used to describe the movement of the system when fastened. This should be minimized to avoid unwanted detachment and shifting during use.

This currently claimed design is similar to other SMP fasteners mentioned above. The major difference is that the currently claimed system always stays near or above the glass transition temperature ($T_g$). The polymer used in the currently claimed system is designed to have a $T_g$ at or below the expected environmental or operational temperature the system will be exposed to. The $T_g$ is important because it is the temperature at which the material turns from a rigid plastic to a soft elastomer. The modulus of this system must stay near the operational temperature to maintain flexibility required to unfasten the system. The $T_g$ is directly related to the modulus of the material and can be tailored by including different combinations of monomers and polymers in the makeup of the resin system.

The material compositions used for this system can be elastomers such as polyurethane, silicone, or rubber or any other polymer or elastomer with a transition temperature which is less than the environment. The selection of composition is based on its toughness to prevent unwanted failure of the fastener. The composition is also based on the modulus of the material. The modulus must be high enough so that it maintains the fastened configuration, but below enough to be able to disengage the fasteners without high forces. In addition, the composition should be such that it will not melt or degrade in operational conditions. The durability, toughness, and flexible nature of elastomers make it a good choice for the Silent Release Fastener system.

The elastomeric nature of the heads and stems prevent the noise associated with current VELCRO®. The design allows for versatility in use with simple attachment and detachment. The nearly silent nature of the fastener makes it possible to use in covert operations such as the military or hunting. It can also be used when trying to avoid waking a baby or disturbing others. The military has many potential applications including clothing, tents, and backpacks. The size of the heads and stems can be of any geometric size and shape capable of being produced, from microscopic sizes to one foot or more.

The mating pieces of the preferred system are identical so there does not have to be a male and female or hook and loop on opposing sides although a system could be designed using male and female connectors. This allows the fasteners to be interchanged more easily. When trying to quickly fasten or unfasten a pouch or piece of equipment, simplicity is key. Not having to line up opposing sides before fastening, but simply blindly pushing the system together is very important. This is a major advantage over zippers or the slidingly engaging fasteners.

No tools are required to use these fasteners. They can be fastened and unfastened by pushing and pulling. This is also important when time is minimal.

FIGS. 2-A thru 2-G show various mating geometries that are contemplated under the present application. It will be apparent to those of skill in the art that other mating geometries may be useful for certain applications and that various geometries may be used with non-identical, but similar geometries, which could be used in any of the embodiments mentioned below.

The following examples use heat or thermal energy as the means to activate the shape memory effect of the SMPs. As previously noted, other means such as light, water, and electromagnetic radiation could also be used to activate the shape memory effect.

Figure 3:
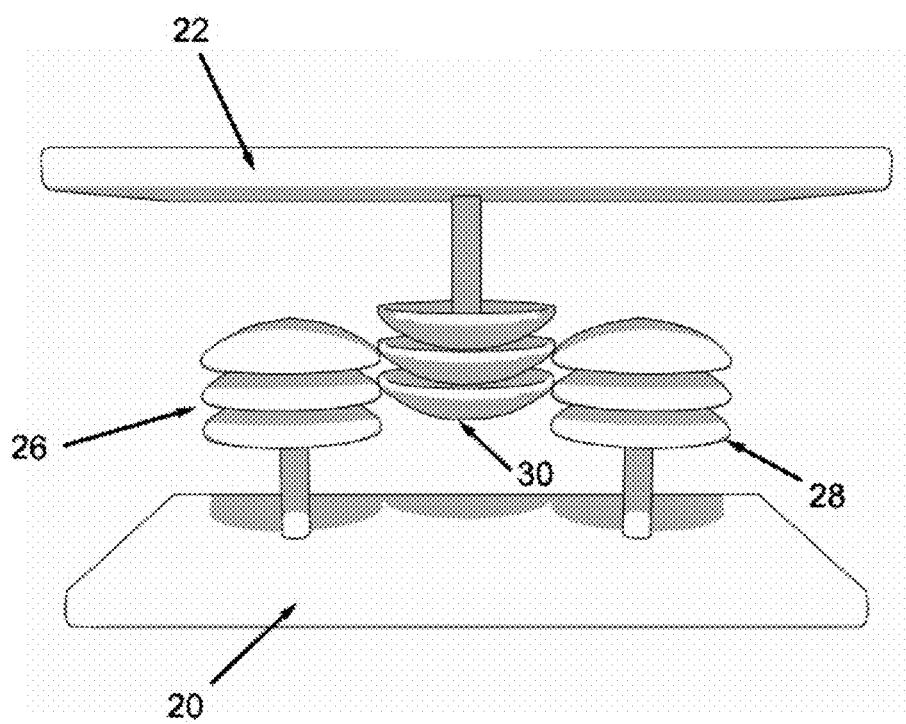
FIG. 3 shows one embodiment of the interlocking design before the parts are joined together.
Figure 4:
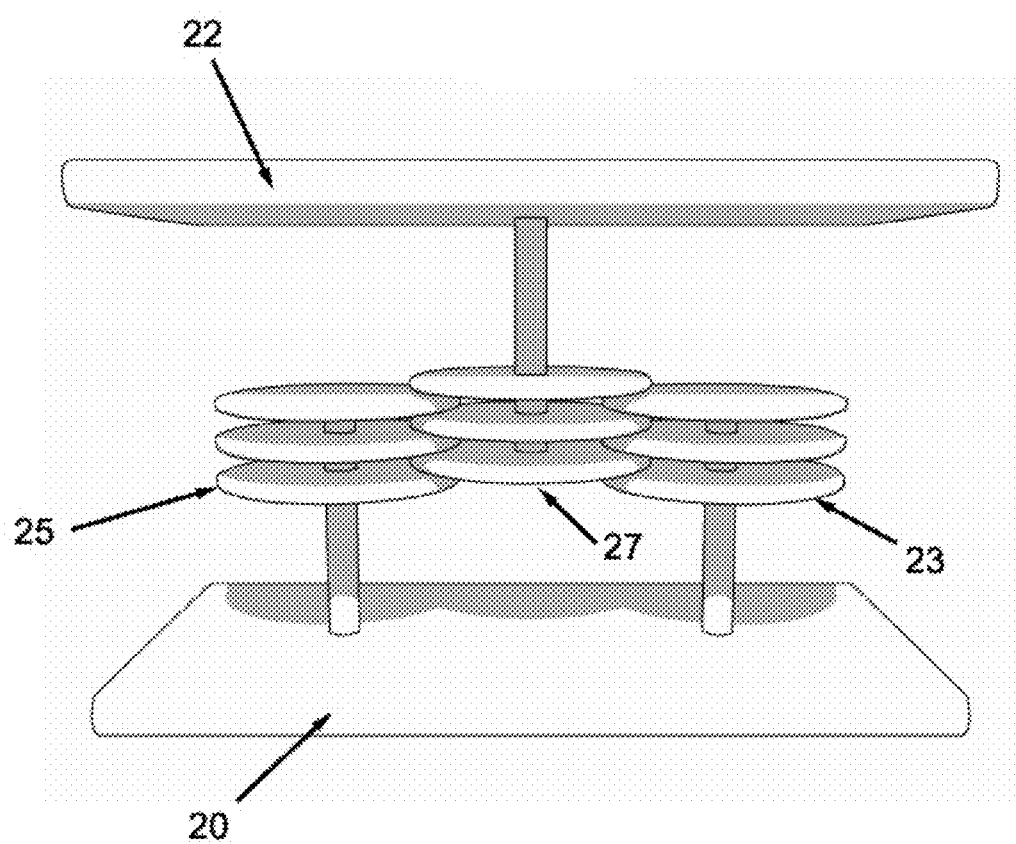
FIG. 4 shows one embodiment of the interlocking design in the process of joining two parts together.
Figure 5:
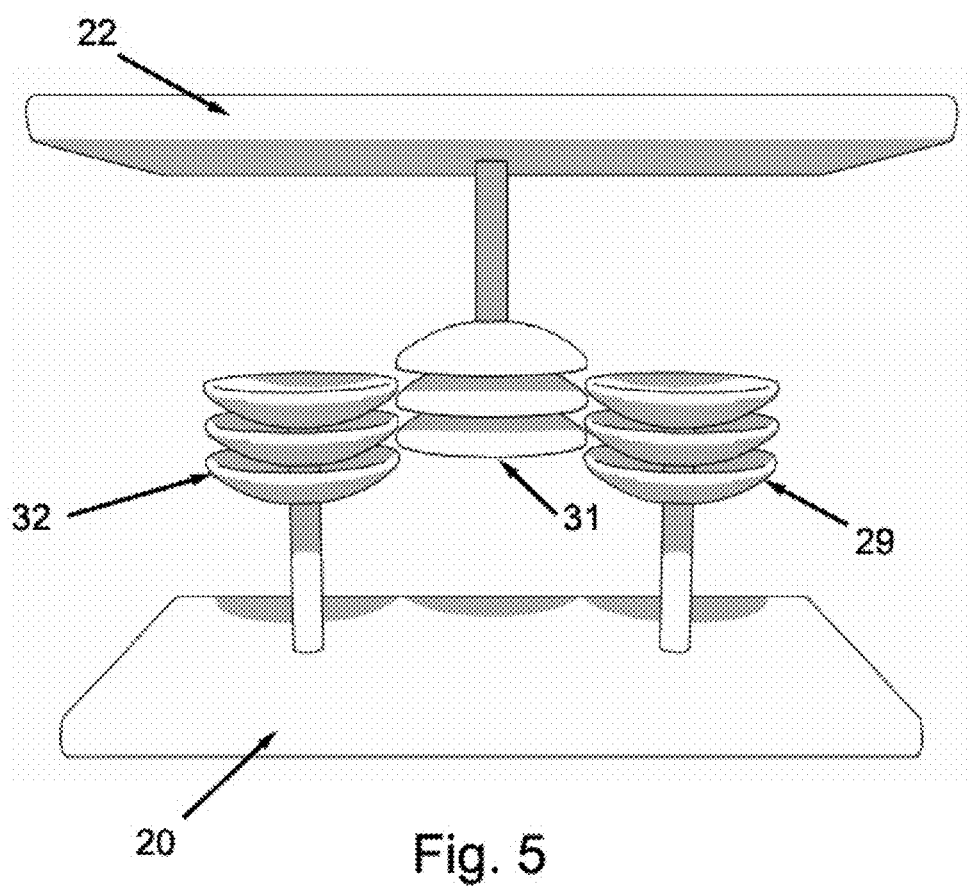
FIG. 5 shows the disengagement of the interlocking design allowing two parts to be separated.

In first embodiment, as shown in FIGS. 3 thru 5, the fastener device's mating geometries can be made in a variety of different geometries as the specific design of the fasteners will be developed by the user for best results in the desired work environment. In FIG. 3 there are two parts, 20 and 22, which are to be fastened together. The fastening devices, 26, 28 and 30, are deactivated, rigid SMP. In order to join parts 20 and 22, the SMP in the fastening devices 26, 28 and 30 is activated. Once activated little force is necessary to push the parts together, as shown in FIG. 4. In FIG. 4 the now soft fastening devices, 23, 25 and 27, form an interlocking network joining parts 20 and 22. In order to ensure that the desired parts remained joined, no additional force should be applied to the system until the SMP in the fastening devices, 23, 25 and 27 has been deactivated. Once deactivated, the SMP turns rigid and the interlocking network of fastening devices becomes very resistant to sheer, pull, tensile, and tear forces, minimizing the chances that parts 20 and 22 will be involuntarily separated from one another. In order to release parts 20 and 22 from one another, the process is simply reversed. The SMP in the fastening devices 23, 25, and 27 is activated. Then, as shown in FIG. 5, parts 20 and 22 are simply pulled away from one another and the SMP, in the now soft fastening devices, 29, 31, and 32 provide little or no resistance to sheer, pull, tensile, or tear forces.

Figure 6:
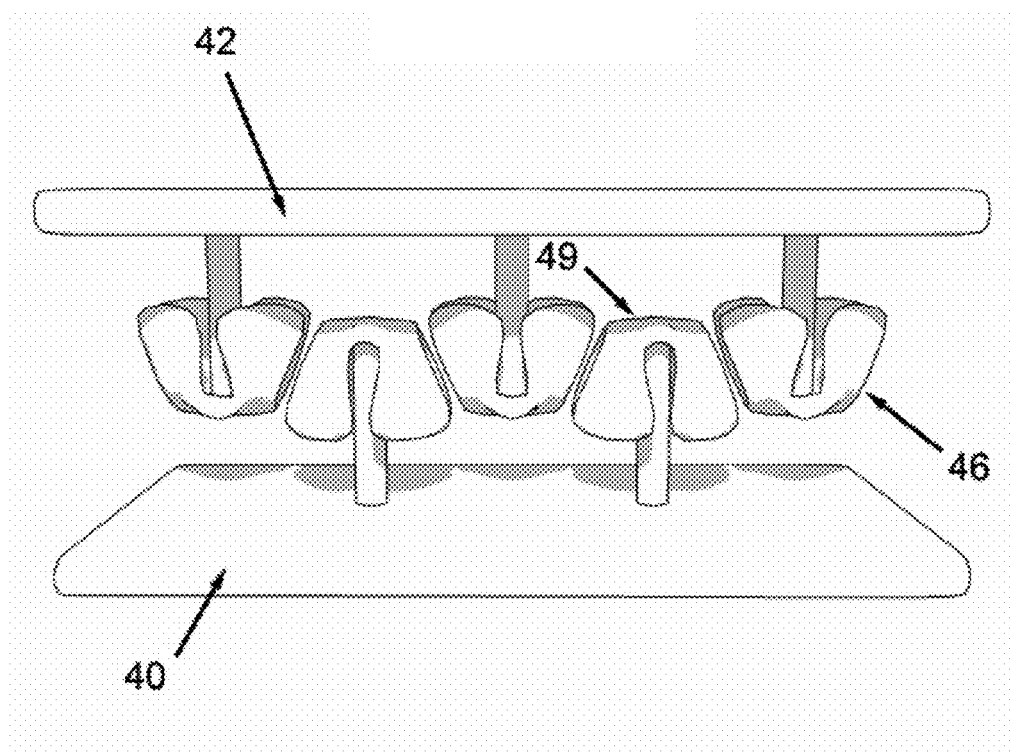
FIG. 6 shows a second embodiment of the interlocking design before the two parts are joined together.
Figure 7:
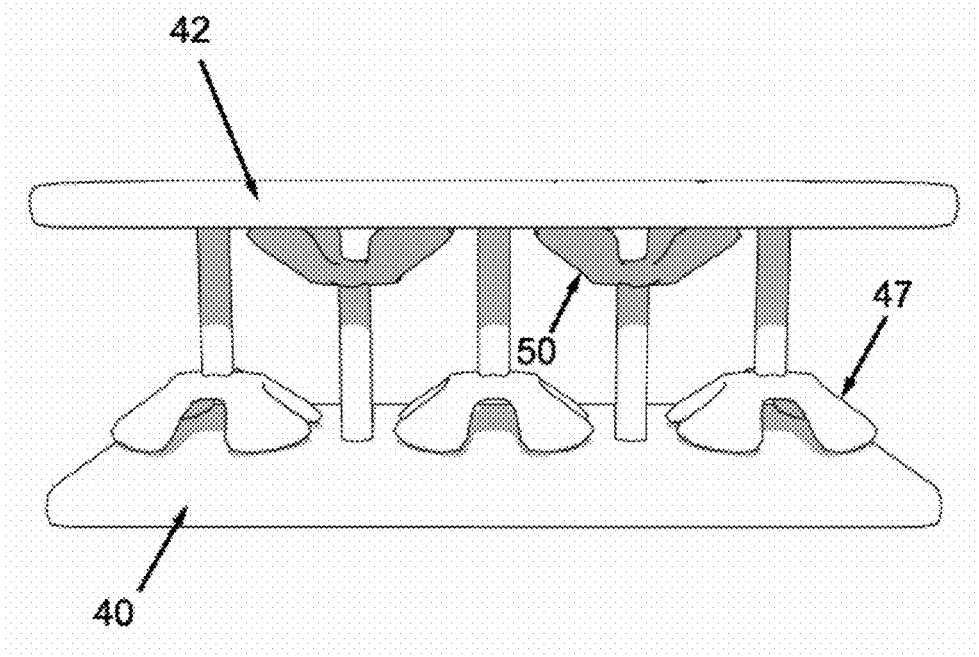
FIG. 7 shows a second embodiment of the interlocking design before the shape memory materials in the connection devices have returned to their memory positions and become rigid.
Figure 8:
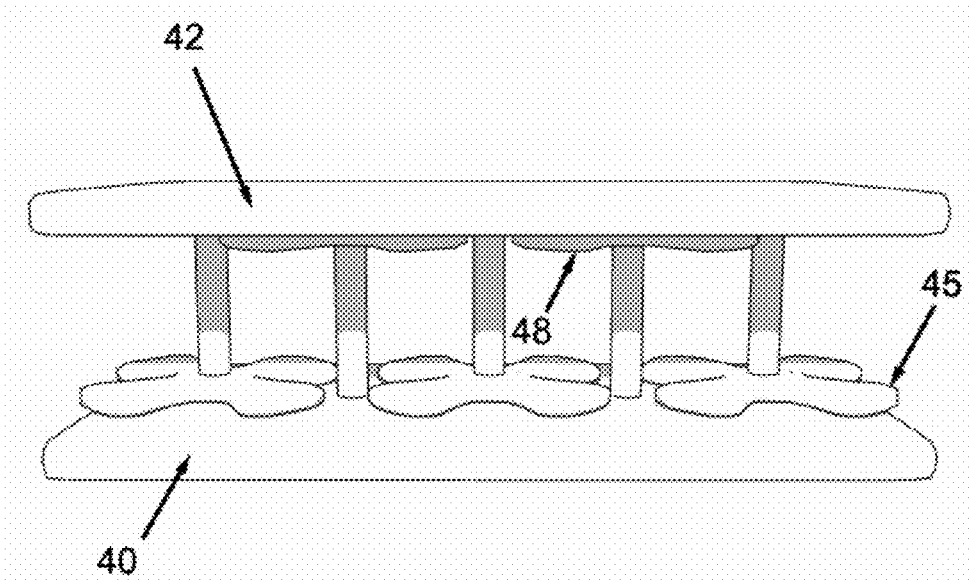
FIG. 8 shows a second embodiment of the interlocking design joining two parts together.
Figure 9:
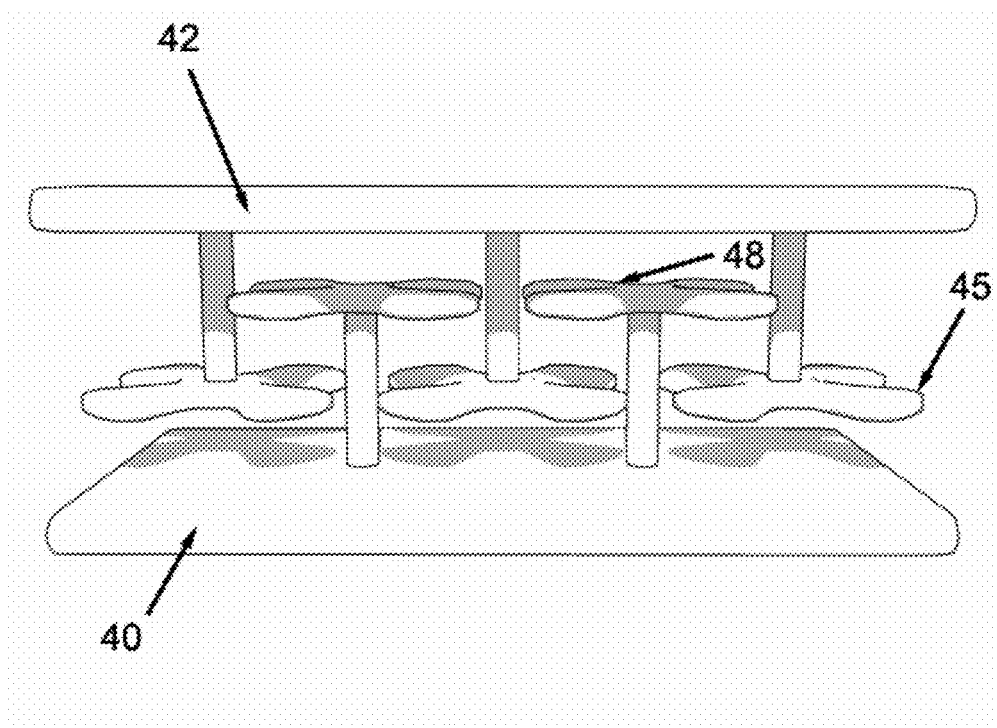
FIG. 9 shows how the second embodiment of the interlocking design prevents the two parts joined from being prematurely separated.

In a second embodiment, as shown in FIGS. 6 thru 10, the fasteners are fabricated in a closed, multi-petal type geometry, such as a closed rosebud or closed pinwheel. As seen in FIG. 6, the SMP in the fasteners is activated to induce the soft, elastic state which would allow the SMP fasteners, 46 and 49, to easily pass by each other as force is applied to join parts 40 and 42. Then, as seen in FIG. 7, as force is continually applied to spread out the fasteners, 47 and 50, into a flat, pinwheel configuration. The final flat configuration of the fasteners, 45 and 48 can be seen in FIG. 8. Once in this position the SMP is then deactivated resulting in an interlocked configuration as seen in FIG. 9 with rigid fasteners.

Figure 10:
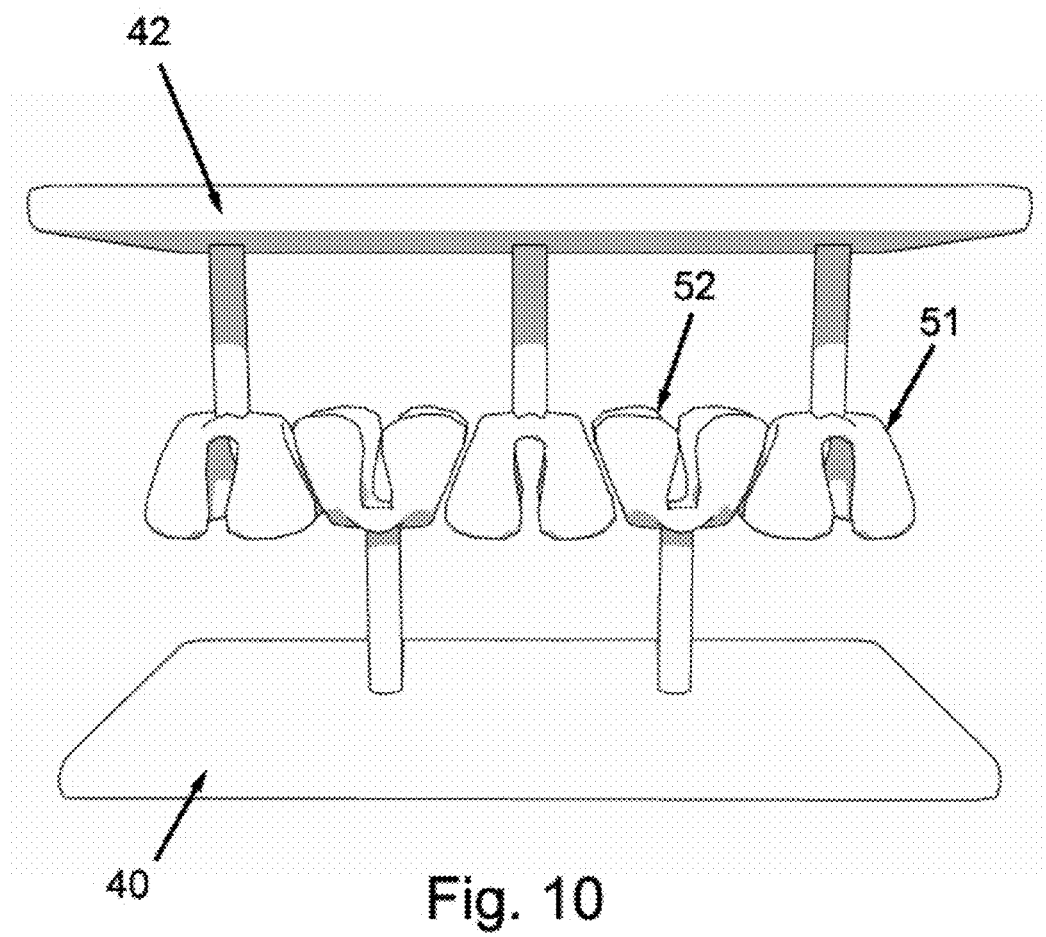
FIG. 10 shows two parts being disengaged from each other due to the interlocking connection devices being in an elastic state.

The parts 40 and 42 can be separated by activating the SMP to a soft and elastic state. As seen in FIG. 10, the fasteners, 51 and 52, can easily pass by one another upon the application of sufficient force to completely release the fasteners and parts 40 and 42. Additionally, the shape change from flat pinwheel to closed bud will greatly assist the release mechanism. The processes and embodiments described above can be repeated multiple times before the SMP will begin to lose its shape memory effect or suffer irreparable damage from over use. Additionally, the parts may be joined without activating the SMP if sufficient force is applied to make the fastening devices form an interlocking network.

Test data gathered from a government program was used to determine the strength of the fasteners. The data was then used to size the necessary fastening area for operation with the morphing tooling actuators. On average the fasteners can support up to 180 psi in shear and 660 psi in tension. It should be noted that the shear properties are obtained using a lap shear type test, which induces both shear forces and bending moments into each unit fastener.

One application of the present disclosure where SMP is the preferred embodiment is the easy attachment of additional armor to military vehicles. The current fleets of light tactical military vehicles are insufficiently equipped with armor protection because these vehicles were never intended for combat on the front line. But due to the change in world climate, these vehicles now need to be up-armored with structural armor panels that are attached directly to the vehicle chassis. These armor panels need to be lightweight but made of strong composite materials. The next-generation composite armor also needs a next-generation armor fastening technology that is quick and easy to apply and replace in the field keeping soldiers out of harm's way.

Light, maneuverable, fast and fully protected vehicles are needed on today's battlefields. Steel armor plates are inexpensive, but extremely heavy, adding thousands of pounds to light trucks. The extra load wears heavily on these vehicles causing premature engine and transmission failures, as well as suspension and brake problems. These conventional steel armor panels are attached to the vehicles by bolting or bonding and cannot be removed without great expense and time. The presently disclosed system uses an SMP as a means to easily and quickly connect large steel plates to these lightly armored vehicles when needed, and then easily and quickly remove the additional armor to prevent unnecessary wear on the vehicles' other mechanical parts.

This innovative fastener technology offers the following benefits: low force required to remove/replace; reduced labor; rapid release/replacement time which reduces the time to remove or attach from minutes and hours, to seconds and minutes; no extra or specialized tooling required; repeatable removal/replacement process without damage to the substrate; and the material can be attached to any structure and/or material, including metals, polymers and composites.

The fastener system disclosed does not need to be limited to off-the-shelf parts and materials. The fastener design can be optimized in an effort to achieve several target values depending on the use and environment in which the system will be expected to operate. The force required to attach the parts together must generally be low in order for this to be a feasible technology. The value of the attachment and detachment forces should be less than 15 psi and more preferably less than 10 psi. The tensile strength of the fasteners is the strength required to detach the fasteners by applying force in the axial direction with a range of at least 100 psi, and more preferably 200 psi or greater. This can be achieved through material selection and design revision. The preferred design holds twenty times more weight in tension than conventional detachable fastener systems and attaches and detaches with less force. This saves valuable time and provides versatile armor options for soldiers in the field.

Shear strength is the property of the fasteners under loads perpendicular to stems.

Current fastener products have a shear strength of 24 psi, tensile strength of 38 psi, and an activated tensile detach strength of 16 psi. The currently disclosed fasteners have a shear strength of 235 psi, a tensile strength of 769 psi, and an activated tensile detach strength of 15 psi.

Additional parameters such as damage resistance, ballistic impact resistance and vibration resistance can be designed into the fastener system based on the selection of SMP formulation and composites selected for use. Those of skill in the art will be able to modify parameters in the manufacture of the presently disclosed process to ensure compliance with the desired use and environmental conditions under which the system will operate. Changing the geometry of the fasteners and their placement on the surfaces to be joined is an additional optimization that those of skill in the art will be able to easily accomplish.

The ability of the fastener system to maintain fastening strength through long term use and potential damage is essential to success. Approaches to overcoming these problems include increasing the amount of reinforcement in the stems and transitioning to a higher strength tow or braid. The point of failure in the fasteners is typically the area of the stem just above the fillet radius. Increasing its strength will yield a stronger fastener system. High strength fiber such as KEVLAR® can be used as a possible reinforcement type.

The stem and head dimensions and properties are the principal variable that will be adjusted to meet the desired design criteria. Other properties such as the material that the fasteners are fabricated from, the location of the fasteners relative to one another, and the numbers of fasteners per area are additional properties that could be varied.

The stems, which are the support system for the heads, can be adjusted to achieve higher tensile and shear strength. To increase the strength of the stems, reinforcements such as a para-aramid, KEVLAR®, or TWARON®, high-strength polyethylene (DYNEEMA®), PBO, or fiberglass can be added. KEVLAR® composites using shape memory polymers are particularly preferred and have proven their compatibility with known resin systems.

The head size and shape should also be optimized to reduce the attachment force and increase the shear strength. A cone or arrow shaped head configuration will reduce the force to slide the heads past one another. The shear strength of the fastener system, which is the main concern in static loading of the fastener system depending on the size and scale of the parts to be attached to each other, is largely dependent on the contact area of the head on the stem. A very small contact area results in yielding of the material. Therefore, if the contact area between the head and stem can be increased, the force is distributed over a larger area on the stem. Increasing the contact surface between the head and stem will improve the overall fastening characteristics. One way to increase that contact area is to increase the surface area of the head. A drawback with this method is that by increasing the surface area of the head the attachment force will increase. A balance should be designed by those of skill in the art so as to achieve a low attachment force while still maintaining a high shear strength.

Finally, the best polymer for the desired application should be selected. Most polymer mechanical properties are dependent on strain rate; therefore, the properties needed for impact modeling may be different than static loading. After the appropriate material properties are selected, those of skill in the art should be able to design the fastener system to meet their individual needs quickly and efficiently.

If a polymer does not provide sufficient mechanical properties a composite may be used. Styrene and epoxy SMP can be formulated with a $T_g$ from room temperature to 120° C. and can be toughened if necessary. The maximum elongation and strength are inversely related. An SMP formulation with less than 100% elongation but with increased strength may be preferable over a SMP formulation that has over 200% elongation with relatively decreased strength.

One example of a shape memory polymer that is useful in the present invention is an epoxy-based SMP. CRG Industries, LLC sells epoxy based SMP under the trade name VERIFLEX® E1, E2, and special custom resins. This epoxy based SMP is preferred and can be bought off the shelf or tailored to provide specific $T_g$. This SMP provides a clear solid shape memory polymer at room temperature that has a glass $T_g$ of approximately 104° C. or other $T_g$ as desired. The resulting material is also tough, as revealed by its resistance to breakage, and with large elongation above its $T_g$, and excellent shape recovery. The rubbery modulus of this material is also significantly higher than the styrene-based SMP.

In addition to epoxy SMP, styrene SMP can be used, however, the epoxy SMP is particularly preferred. Styrene SMP can also be bought from CRG Industries, LLC under the trade name VERIFLEX® and can be formulated to provide a specific $T_g$.

It is possible that not all parts of the composite fastener need to be fabricated from SMP material. Additionally, not all fastening devices need be made of SMP, so long as one set of fasteners is made of such material and the geometries of each set of fasteners are such that when the fasteners are joined they form an interlocking network. Therefore while it is preferred that both sets of fasteners be fabricated from SMP and have identical mating geometries, this is not required.

In other embodiments where low forces are needed to ensure that the container, pocket, or other device stays closed and/or the level of noise to open or close the container is desired to be low, elastomers are the preferred polymers needed to make the fastening devices. These elastomers will typically have a $T_g$ below that of the expected environmental conditions, so that the elastomers will always be soft and pliable. It is because they are always soft and pliable that quick and quiet fasteners can be made. The sound generated by the separation of a first part and a second part fastened together by such quiet fasteners can be no louder than forty decibels, no louder than twenty decibels, or even no louder than ten decibels.

Elastomers also provide sufficient mechanical properties to securely hold two mating geometries together in a low stress/strain environment, such as a pocket or other container where there is no expectation that the fasteners will be exposed to large enough forces to open them unexpectedly.

The most preferred fabrication of the elastomer-based fasteners involves a vacuum-assisted resin transfer molding ("VARTM") process. This process involves assembling a vacuum bag with substrate materials and stem mold, pulling a vacuum, and then infusing the resin. The elastomer resin wets the substrate fabric and then fills the stems without voids. Elastomer stems or elastomer composite stems can be made with commercially available elastomers or other resins. In order to de-mold the composite from the stem tray, the elastomer part is pulled away from the stem tray as a silicone mold is used to infuse the entire part at the same time. The VARTM approach yields a fully-infused, structurally sound composite part.

In order to make the quiet release fasteners, a mold material was identified to achieve proper elongation, durability, and chemical compatibility. Several silicones were considered, but the ultimate chemical compatibility and physical properties were found in Dow Corning's SILASTIC® S. This mold making material displayed ideal properties in modulus of elasticity, tear strength, tensile strength, and durometer. The process uses a negative silicone mold that undergoes vacuum assisted resin transfer molding (VARTM) to infuse the fiberglass base and fill the mold for the heads and stems.

The silicone mold was fabricated using a replicate of the fasteners. A rapid prototype process was used to create the cast in which the silicone was then molded over. This process is advantageous because of its cost and ability to build complex parts and it provides flexibility to modify designs quickly. Through several iterations, it was determined that the effects of the silicone's coefficient of thermal expansion (CTE) were significant and needed to be considered in the rapid prototype design.

Because of the small size and intricacy associated with this part, the appropriate rapid prototype method to make the mold was not trivial. The support material used during the rapid prototype process caused a rough surface on the stem. This roughness is transferred to the silicone mold, which in turn is transferred to the SMP fasteners. This causes stress concentrations on the stem, resulting in lower strength.

A metal master mold, using stems made on a screw machine is the preferred approach to take to manufacture the fasteners. An array of holes was drilled into a high-tolerance ground flat plate. The stems and heads were made on a screw machine and then were inserted into the array of holes in the plate. A screw machine works by machining a profile into a stock rod, then cutting it to length. It repeats this process quickly to manufacture screws cost effectively. A custom tool was required to achieve the head and stem profile desired and can be machined to each design by those of skill in the art.

In addition to the mold being manufactured in a larger footprint (12"×12" versus 6"×6"), there are also improvements in the stem profile. The rapid prototype created a rough surface texture that was produced by the layering of material during the build. This surface was transferred to the stem and caused stress concentrations in the stem, where the majority of failure occurs. The smooth surface of the metal was transferred to the silicone, which was in turn transferred to the fastener part and decreased the stresses and increased the reliability of the fasteners.

The rapid release fasteners fulfill a need that exists to improve temporary shelters. This fastener system can be used to keep walls in place temporarily, while resisting impact and shock loadings. This system design allows easy disassembly by simply activating the fastener system. The fasteners can also be used for temporarily armor shelters similar to applique armor vehicles. Soft-sided shelters will also benefit from high strength removable fasteners.

While the disclosure has been described with reference to several exemplary embodiments, it will be understood by those of skill in the art that various changes may be made and equivalents may be substituted for elements thereof without departing from the scope of the present disclosure. In addition, many of the modifications may be made to adapt a particular situation or material to the teachings of the disclosure without departing from the essential scope thereof. Therefore, it is intended that the disclosure not be limited to the particular embodiments disclosed as the best mode contemplated for carrying out this discovery, but that the disclosure will include all embodiments falling within the scope of the appended claims.

The invention claimed is:

1. A method for using a reusable quick release fastener system at an expected environmental temperature, the method comprising:

providing a first part having a first base and a plurality of first individual fasteners formed of a flexible material having a transition temperature that is below the expected environmental temperature such that the flexible material is always soft and pliable at the expected environmental temperature, the flexible material being chosen from elastomers, elastomeric composites, shape memory polymers, and shape memory polymer composites, the first individual fasteners each comprising a first stem attached with a rounded seam to a first head of the first individual fastener and with a rounded edge to the first base, each first head having a first face edge and a first back edge;

providing a second part having a second base and a plurality of second individual fasteners formed of a flexible material having a transition temperature that is below the expected environmental temperature such that the flexible material is always soft and pliable at the expected environmental temperature, the flexible material being chosen from elastomers, elastomeric composites, shape memory polymers, and shape memory polymer composites, the second individual fasteners each comprising a second stem attached with a rounded seam to a second head of the second individual fastener and with a rounded edge to the second base, each second head having a second face edge and a second back edge;

pushing the first part against the second part at the expected environmental temperature such that the first stems of the first individual fasteners and the second stems of the second individual fasteners flex to allow the first back edges of the first individual fasteners to move past the second face edges of the second individual fasteners into cavities defined by recessed portions of the second stems between the rounded seams of the second stems and the rounded edges of the second stems, to place the first part and the second part in a fastened state in which the first back edges overlap the second back edges and interlock the first individual fasteners and the second individual fasteners; and maintaining the fastened state at the expected environmental temperature.

2. The method of claim 1, wherein the first heads of the first individual fasteners and the second heads of the second individual fasteners have shapes chosen from semicircles, hemispheres, spheres, arrow heads, and cones.

3. The method of claim 1, wherein the flexible material is an elastomer or an elastomeric composite containing the elastomer.

4. The method of claim 3, wherein the elastomer is chosen from polyurethanes, silicones, and rubbers.

5. The method of claim 3, wherein the first heads and the first stems of the first individual fasteners and the second heads and the second stems of the second individual fasteners consist of neat elastomer.

6. The method of claim 5, wherein the first base and the second base are fiber-reinforced substrates.

7. The method of claim 3, further comprising:

pulling the first part away from the second part at the expected environmental temperature such that the first stems of the first individual fasteners and the second stems of the second individual fasteners flex and allow the first heads of the first individual fasteners made of the soft and pliable elastomer to move quietly past the second heads of the second individual fasteners made of the soft and pliable elastomer while the first part is separated from the second part.

8. The method of claim 3, wherein the first heads and the first stems of the first individual fasteners have geometries identical to geometries of the second heads and the second stems of the second individual fasteners.

9. The method of claim 8, wherein the first heads of the first individual fasteners and the second heads of the second individual fasteners have shapes chosen from semicircles, hemispheres, spheres, arrow heads, and cones.

10. The method of claim 3, wherein:

the first part and the second part are components of an article chosen from a pocket, a box, a container, a garment, a tent, and a backpack; and pushing the first part against the second part closes the article to prevent involuntary opening of the article.

11. The method of claim 1 wherein the flexible material is a shape memory polymer or a shape memory composite containing the shape memory polymer, the shape memory polymer having an elastic activated state and a rigid deactivated state and being chosen from styrene shape memory polymers, cyanate ester shape memory polymers, maleimide shape memory polymers, epoxy-based shape memory polymers, acrylate shape memory polymers, polyurethane shape memory polymers, and vinyl ester shape memory polymers.

12. The method of claim 11, wherein the shape memory polymer is an epoxy-based shape memory polymer.

13. The method of claim 11, wherein the flexible material is a shape memory composite of the shape memory polymer and at least one layer of fibrous material.

14. The method of claim 13, wherein the fibrous material is embedded in the shape memory polymer.

15. The method of claim 13, wherein said fibrous material is impregnated with the shape memory polymer.

16. The method of claim 13, wherein the fibrous material comprises carbon nano-fibers, carbon fiber, a high strain fabric, a chopped fiber, a random fiber mat, a fabric of any material, a continuous fiber, a fiberglass, or a textile fabric.

17. The method of claim 13, wherein said fibrous material is in the form of a flat weave, a two dimensional weave, or a three dimensional weave pattern.

18. A method for using fasteners attached to a first part and a second part of an article at an expected environmental temperature, the method comprising:

providing the first part of the article having a first base and a plurality of first individual fasteners formed of a flexible material having a transition temperature that is below the expected environmental temperature such that the flexible material is always soft and pliable at the expected environmental temperature, the flexible material being chosen from elastomers, elastomeric composites, shape memory polymers, and shape memory polymer composites, the first individual fasteners each comprising a first stem attached with a rounded seam to a first head of the first individual fastener and with a rounded edge to the first base, each first head having a first face edge and a first back edge;

providing the second part of the article having a second base and a plurality of second individual fasteners formed of a flexible material having a transition temperature that is below the expected environmental temperature such that the flexible material is always soft and pliable at the expected environmental temperature, the flexible material being chosen from elastomers, elastomeric composites, shape memory polymers, and shape memory polymer composites, the second individual fasteners each comprising a second stem attached with a rounded seam to a second head of the second individual fastener and with a rounded edge to the second base, each second head having a second face edge and a second back edge;

pushing the first part of the article against the second part of the article at the expected environmental temperature such that the first stems of the first individual fasteners and the second stems of the second individual fasteners flex to allow the first back edges of the first individual fasteners to move past the second face edges of the second individual fasteners into cavities defined by recessed portions of the second stems between the rounded seams of the second stems and the rounded edges of the second stems, to place the first part of the article and the second part of the article in a fastened state in which the first back edges overlap the second back edges and interlock the first individual fasteners and the second individual fasteners and the article is closed; and maintaining the fastened state of the first part of the article and the second part of the article at the expected environmental temperature.

19. The method of claim 18, further comprising:
pulling the first part of the article away from the second part of the article at the expected environmental temperature such that the first stems of the first individual fasteners and the second stems of the second individual fasteners flex and allow the first heads of the first individual fasteners made of the soft and pliable elastomer to move quietly past the second heads of the second individual fasteners made of the soft and pliable elastomer while the first part of the article is separated from the second part of the article.

20. The method of claim 18, wherein:
the article is chosen from a pocket, a box, a container, a garment, a tent, and a backpack; and
pushing the first part of the article against the second part of the article closes the article to prevent involuntary opening of the article.

* * * * *